(12) United States Patent
Faraldi et al.

(10) Patent No.: US 7,303,328 B2
(45) Date of Patent: Dec. 4, 2007

(54) DISPOSABLE CARTRIDGE FOR MIXING EXOTHERMIC OR ENDOTHERMIC REACTION SUBSTANCES, AND RELATIVE CARTRIDGE-SUPPORT ASSEMBLY

(75) Inventors: Paolo Faraldi, San Remo (IT); Marco Federico Pidria, Orbassano (IT); Edoardo Merlone Borla, Candiolo (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 503 days.

(21) Appl. No.: 10/850,964

(22) Filed: May 20, 2004

(65) Prior Publication Data

US 2005/0007870 A1    Jan. 13, 2005

(30) Foreign Application Priority Data

May 20, 2003    (IT)    .......................... TO2003A0372

(51) Int. Cl.
  *B01F 3/12*    (2006.01)
  *B01F 15/02*    (2006.01)
  *B65D 25/08*    (2006.01)

(52) U.S. Cl. ...................... 366/101; 366/130; 366/189; 206/222

(58) Field of Classification Search ................ 366/130, 366/101, 189; 206/222; 604/86, 87, 88
   See application file for complete search history.

(56) References Cited

U.S. PATENT DOCUMENTS

| | | | |
|---|---|---|---|
| 1,592,632 A * | 7/1926 | Hahn | 206/222 |
| 2,184,152 A * | 12/1939 | Saffir | 206/222 |
| 2,694,641 A * | 11/1954 | Marshall et al. | 426/8 |
| 2,753,868 A * | 7/1956 | Seemar | 206/222 |
| 3,347,410 A * | 10/1967 | Schwartzman | 206/222 |
| 3,521,745 A * | 7/1970 | Schwartzman | 206/222 |
| 3,537,605 A * | 11/1970 | Solowey | 206/222 |
| 3,715,189 A * | 2/1973 | Nighohossian et al. | 422/61 |
| 3,842,836 A * | 10/1974 | Ogle | 604/416 |
| 3,860,114 A * | 1/1975 | Merckardt | 206/219 |
| 4,254,768 A * | 3/1981 | Ty | 604/518 |
| 4,608,043 A * | 8/1986 | Larkin | 604/87 |
| 5,071,034 A * | 12/1991 | Corbiere | 206/222 |

(Continued)

FOREIGN PATENT DOCUMENTS

DE    1 551 361    3/1970

(Continued)

OTHER PUBLICATIONS

IBM Corp., "Endothermic Cooling Cartridge," *IBM Technical Disclosure Bulletin* 37(11):567-571, Nov. 1994.

*Primary Examiner*—Tony G. Soohoo
(74) *Attorney, Agent, or Firm*—Seed IP Law Group PLLC

(57) ABSTRACT

The cartridge has two compartments normally for containing two substances of the mixture, which are separated by a preferential break member; one of the two compartments contains a liquid solvent, and is fitted with a bellows having an intake valve and for producing a pumping action by varying the volume of the bellows by exerting pressure on the bellows. The bellows first causes breakage of the member to mix the two substances, and then produces flow of the mixture to accelerate its reaction. The cartridge is insertable inside a cavity of a support for heating or cooling in predetermined conditions.

27 Claims, 1 Drawing Sheet

U.S. PATENT DOCUMENTS

| | | | | |
|---|---|---|---|---|
| 5,169,388 A | * | 12/1992 | McPhee | 604/90 |
| 5,188,615 A | * | 2/1993 | Haber et al. | 604/87 |
| 5,409,140 A | | 4/1995 | Camm et al. | 222/80 |
| 5,685,422 A | * | 11/1997 | Kim | 206/222 |
| 5,769,215 A | * | 6/1998 | Kim | 206/222 |
| 6,165,523 A | * | 12/2000 | Story | 206/222 |
| 6,305,576 B1 | * | 10/2001 | Leoncavallo | 206/222 |
| 6,517,878 B2 | * | 2/2003 | Heczko | 206/219 |
| 2003/0012690 A1 | | 1/2003 | Taylor et al. | 42/32 |

FOREIGN PATENT DOCUMENTS

| | | |
|---|---|---|
| EP | 001486252 A1 * | 12/2004 |
| FR | 649 558 | 12/1928 |
| JP | 2000-60405 | 2/2000 |

* cited by examiner

DISPOSABLE CARTRIDGE FOR MIXING EXOTHERMIC OR ENDOTHERMIC REACTION SUBSTANCES, AND RELATIVE CARTRIDGE-SUPPORT ASSEMBLY

BACKGROUND OF THE INVENTION

1. Field of the Invention

The present invention relates to a disposable cartridge for mixing exothermic or endothermic reaction substances, and to an assembly of such a cartridge and a support for heating or cooling.

2. Description of the Related Art

Substances are known which, when mixed, produce an exothermic reaction generating heat, or an endothermic reaction absorbing heat from, i.e. cooling, the outside environment. Mixing normally consists of dissolving or solvation of a solute in a liquid solvent, and, since the solute is normally in the form of solid granules, must be assisted, e.g. by shaking the solvent-solute mixture, at the time of use, to speed up complete dissolution and reaction of the substances.

Various types of containers or cartridges are known which have two or more compartments containing different substances to be mixed at the time of use—typically for use as separate systems—and which are small enough to be shaken by hand. When the container is to be connected to a support for heating or cooling, however, very often the system as a whole cannot be shaken by hand when mixing the substances. In some known cases, the substances are placed inside a reusable container. In other known cases, involving disposable containers, the substances must still be mixed at the time of use inside the container detached from the support, by shaking the container, which must then be connected to the support while the exothermic or endothermic reaction is already taking place.

Known systems therefore have various drawbacks. In particular, connecting the container to the support while the reaction is in progress greatly impairs efficient use of the energy generated. Moreover, connecting and disconnecting the container to and from the support is a skilled, and therefore fairly high-cost, operation, in which the operator may come into contact with very hot surfaces. Finally, systems involving reusable containers call for washing and replacing the container, which is unfeasible for other than high-cost applications.

A disposable container, of the type used for medical infusions, is known comprising two compartments made of flexible plastic material and separated by a preferential break region, which is broken at the time of use by pressing on the wall of one of the compartments; and the container can then be shaken by hand to assist mixing of the two substances. This type of container, however, is unsuitable for heat exchange with a support.

In another known embodiment for food applications, the container for heating/cooling is incorporated in the heating/cooling system. The assembly as a whole, however, is of limited size and cannot be interfaced with external systems.

BRIEF SUMMARY OF THE INVENTION

It is an object of the invention to provide a disposable cartridge for mixing normally separate exothermic or endothermic reaction substances, and which is cheap and highly reliable. It is a further object of the invention to provide a cartridge for mixing substances with no need for manual shaking, and which can therefore also be used even when fitted to a substantially fixed system.

According to the present invention, there is provided a disposable cartridge for mixing exothermic or endothermic reaction substances, and which comprises two compartments having substantially rigid walls and normally containing two separate substances of the mixture; characterized in that said compartments are separated by a preferential break member; one of said compartments having means which can be operated to break said member and mix said substances; and said means also generating flow of the mixture to accelerate its reaction without shaking the cartridge.

According to the present invention, there is also provided an assembly of said cartridge and a support for heating or cooling, wherein the support is substantially fixed; said cartridge being connected to said support prior to operation of said means.

BRIEF DESCRIPTION OF THE DRAWINGS

A preferred, non-limiting embodiment of the invention will be described by way of example with reference to the accompanying drawings, in which.

DETAILED DESCRIPTION OF THE INVENTION

Figure 1:
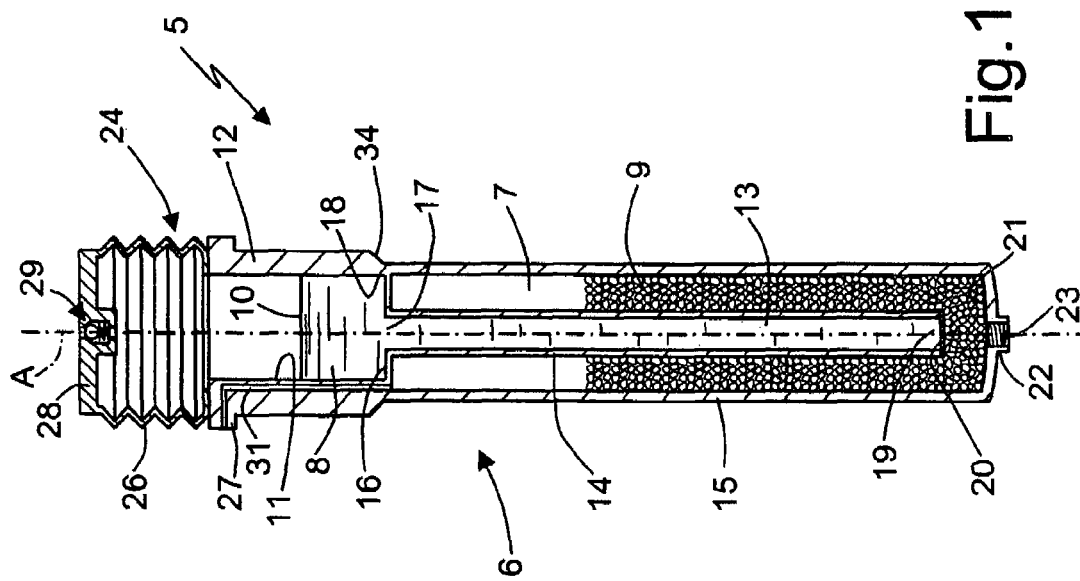
FIG. 1 shows an axial section of a disposable cartridge for mixing substances in accordance with the invention.

With reference to FIG. 1, number 5 indicates as a whole a disposable cartridge for mixing substances to produce an exothermic or endothermic reaction salvation. Cartridge 5 comprises a tapered body 6 having a given straight axis A; and body 6 comprises two compartments 7 and 8 having substantially rigid walls and containing two different, normally separate substances.

More specifically, the exothermic or endothermic reaction is produced by dissolving a normally granular solute 9, normally contained in compartment 7, with a liquid solvent 10 normally contained in compartment 8. Solute 9 may be anhydrous calcium chloride ($CaCl_2$) for an exothermic reaction, and hydrous sodium thiosulphate ($Na_2S_2O_3$) for an endothermic reaction. Solvent 10 is normally water or, in the case of an exothermic reaction, an antifreeze mixture of water and ethylene glycol or ethyl alcohol.

More specifically, compartment 8 of solvent 10 comprises a substantially cylindrical first portion 11 having a lateral wall 12 coaxial with axis A. A second portion 13 of compartment 8 has a lateral wall 14 also coaxial with axis A, smaller in diameter than lateral wall 12, and extending axially along almost the whole length of cartridge 5. Portion 13 is housed inside compartment 7, which has a lateral wall 15 also coaxial with axis A, so that compartment 7 has a substantially annular section, and walls 12 and 15 define the outer lateral walls of cartridge 5.

More specifically, one end 16 of first portion 11 of compartment 8 communicates with a first end 17 of second portion 13; the relative lateral walls 12 and 14 are connected by a flat annular wall 18; and another end 19 of portion 13 is closed by a preferential break member defined by a very thin, breakable end wall 20, preferably of a maximum thickness of 0.1 mm.

Compartment 7 of solute 9 has an end wall 21 located a small distance from wall 20 and having a fitting 22 closed, for example, by a plug 23. Alternatively, wall 21 may have no fitting 22, and wall 15 may be fitted to the rest of the cartridge once filled with solute 9.

Compartments 7 and 8 are preferably made of low-cost plastic material, e.g. low-density polyethylene (LDPE), which is fitted to end 19 in any manner. Thin wall 20 of compartment 8 may also be made of the same material and formed, for example, in one piece or integrally with compartment 8.

Alternatively, thin wall 20 may be made separately of medium-density polyethylene (PE) or ethyl vinyl acetate (EVA), or may be made of a thin sheet of metal, e.g. aluminium. If cartridge 5 has a fitting 22, thin wall 20 is inserted inside cartridge 5 through fitting 22 and soldered to end 19 of portion 13 in any known manner. In any case, thin wall 20 may have a groove (not shown) to assist breakage.

Cartridge 5 also comprises means that can be operated to break the preferential break member to mix the two substances, and to generate flow of the mixture to dissolve it faster and so accelerate its reaction without shaking cartridge 5. Such means is to be understood broadly to include any pressurizing source that can be actuated to increase or decrease pressure within an interior. Said means can be, for example, a thumb actuated pump or a bellows, indicated as a whole by 24, which increases pressure inside compartment 8. More specifically, one example is a bellows 24 comprises an undulated lateral wall 26 made of elastic material of such a thickness as to enable it to be compressed and extended. Undulated wall 26 is fixed in any known manner to a flange 27 at the opposite end to end 16 of portion 11 of compartment 8, so that bellows 24 is also coaxial with axis A.

Bellows 24 also comprises a substantially flat, top cover wall 28 preferably made of the same material as undulated wall 26. Cover wall 28 is of such a thickness as to be substantially rigid, and has an opening in which is fixed in any known manner an intake valve 29 for filling bellows 24 with air, but preventing air from escaping. Finally, a conduit 31 is formed inside lateral wall 12 of portion 11 of compartment 8 to connect compartment 7 to the outside and release any surplus air pumped in by bellows 24.

Figure 2:
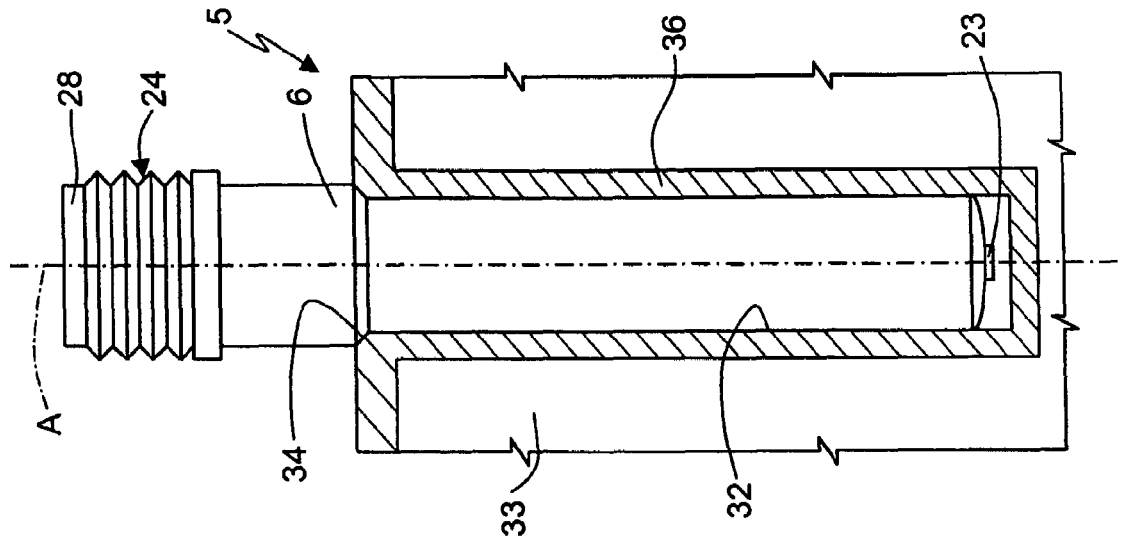
FIG. 2 shows a partly sectioned view of a cartridge-support assembly.

Cartridge 5 is inserted removably inside a seat defined by a cavity 32 (FIG. 2) of a support 33 to be heated or cooled in given conditions. To ensure correct insertion of cartridge 5, lateral wall 12 of portion 11 of compartment 8 has a shoulder 34 defining the axial position of cartridge 5 inside cavity 32. Wall 15 of compartment 7 may also have a groove for exhausting any air from cavity 32 when mounting cartridge 5.

Assuming support 33 cannot, or for any reason is not to, be shaken to produce the exothermic or endothermic reaction, e.g. assuming support 33 is defined by a fixed hydraulic circuit container forming part of a complex apparatus, cavity 32 in this case is defined by a wall 36 of support 33. If the liquid in support 33 is subject to occasional changes in state in particular operating or stasis conditions, temporary heating or cooling may be required to restore operation.

Substances 9 and 10 are inserted into cartridge 5 as follows. First, the required amount of solute 9 is inserted inside compartment 7 through fitting 22, which is then either closed using plug 23 or heat sealed. If compartment 7 has no fitting 22, compartments 7 and 8 are prepared separately. Compartment 7 is first filled with solute 9, and wall 15 is then fitted, e.g. hot fitted, to compartment 8.

Finally, solvent 10 is inserted into compartment 8 in any known manner, e.g. via intake valve 29.

To heat or cool support 33, after inserting exothermic or endothermic cartridge 5 inside cavity 32, wall 28 of bellows 24 is acted on repeatedly, e.g. pressed with a finger, so that, when a given air pressure is reached inside compartment 8, thin wall 20 breaks, and solvent 10 flows partly into compartment 7 and into contact with the granules of solute 9.

Continuing the action on wall 28 of bellows 24, the air pumped by the bellows into compartment 8 produces flow in the solution and mixture, which is also transmitted to compartment 7, thus assisting dissolution of solute 9 in solvent 10, i.e. accelerating the solvation reaction. The generation or subtraction of heat produced by the reaction is thus accelerated with no need to shake cartridge 5, which, after use, can be removed from cavity 32 and replaced with a new cartridge ready to restore operation of support 33 when necessary.

The advantages, as compared with known systems, of the cartridge according to the invention will be clear from the foregoing description. In particular, one or more substances in the mixture need no longer be poured each time into a mixer; the mixture need not be shaken manually, either before or after fitting cartridge 5 to support 33; and none of the heat produced or subtracted by cartridge 5 during the reaction is lost.

Clearly, changes may be made to the cartridge as described herein without, however, departing from the scope of the accompanying Claims. For example, intake valve 29 may be located in lateral wall 12 of portion 11, and/or conduit 31 may be formed in lateral wall 15 of compartment 7; thin wall 20 may be designed to open peripherally or so that a limited portion of its area opens; and thin wall 20 may be defined by a limited portion of lateral wall 14 of portion 13 of compartment 8.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A disposable cartridge for mixing exothermic or endothermic reaction substances, comprising:
    a first compartment and a second compartment, said compartments having substantially rigid walls, and said compartments separately containing two substances;
    a preferential break member separating said first and second compartments;
    a bellows connected to said second compartment for pressurizing air so as to cause a solvent to break said preferential break member and mix said substances to provide a mixture, and for generating a flow operable to accelerate a reaction without shaking the cartridge;
    an intake valve for drawing in outside air; and
    a conduit being formed in an outer wall of the cartridge to release the pressurized air pumped into the compartments by operation of said bellows.

2. The cartridge of claim 1, wherein one of said substances is a solute in solid granular form, and is normally contained in a first of said compartments; and the other of said substances is a liquid solvent and is normally contained in a second of said compartments.

3. The cartridge of claim 2, wherein said solute is calcium chloride or sodium thiosulphate, and wherein said solvent is water, a mixture of water and ethylene glycol, or a mixture of water and ethyl alcohol.

4. The cartridge of claim 1, wherein said flow is produced by repeatedly operating said bellows following breakage of said preferential break member.

5. The cartridge of claim 1, wherein said outer wall encloses said second compartment.

6. The cartridge of claim 5, wherein the cartridge is tapered and has a given straight axis, and wherein said second compartment comprises a first portion coaxial with said axis and has a lateral wall forming said outer wall.

7. The cartridge of claim 6, wherein said second compartment further comprises:
a second portion also coaxial with said axis and having one end communicating with said first portion, and having another end supporting said preferential break member.

8. The cartridge of claim 7, wherein said second portion of the second compartment extends axially, and is smaller in diameter than said first portion, said wherein the first compartment houses said second portion, and is substantially coaxial with it.

9. The cartridge of claim 8, wherein said bellows is connected to an opposite end of said first portion from said second portion, said bellows also being coaxial with said axis.

10. The cartridge of claim 9, wherein said bellows comprises an undulated lateral wall made of elastic material.

11. The cartridge of claim 10, wherein said bellows is made of the same material as the cartridge.

12. The cartridge of claim 7, wherein said preferential break member is defined by a thin sheet of aluminium fitted to the end supporting said preferential break member.

13. The cartridge of claim 7, wherein said preferential break member is integral with the end supporting said member, and has a groove to assist breakage.

14. The cartridge of claim 1, wherein said compartments are made of low-cost plastic material, and wherein said preferential break member is made of easily breakable plastic or metal, and has a maximum thickness of 0.1 mm.

15. The cartridge of claim 14, wherein said low-cost plastic material is a low-density polyethylene, and wherein said preferential break member is made of polyethylene or ethyl vinyl acetate.

16. The cartridge of claim 1, further comprising:
a support for heating or cooling, wherein, said support is substantially fixed and said cartridge is connected removably to said support prior to operation of said means.

17. The cartridge of claim 16, wherein said support has a cavity for housing said cartridge.

18. A cartridge for mixing exothermic or endothermic reaction substances, comprising:
a first compartment containing a first substance;
a second compartment containing a second substance;
a preferential break member being part of a wall of said second compartment, said preferential break member being in communication with said first compartment in such a way that when said preferential break member breaks, said second substance mixes with said first substance to provide a reaction mixture;
a pressurization source connected to said second compartment, said source pressurizing the interior of said second compartment thereby breaking said preferential break member and generating a flow of the reaction mixture to facilitate mixing said first and second substances;
an intake valve for drawing in outside air; and
a conduit in an outer wall of the cartridge to release the pressurized air pumped into the second compartment by operation of said pressurizing source.

19. The cartridge of claim 18, wherein the first compartment and the second compartment are substantially coaxial, and a portion of the second compartment comprising the preferential break member is housed within the first compartment.

20. The cartridge of claim 18, wherein the preferential break member is made of easily breakable plastic or metal and has a maximum thickness of 0.1 mm.

21. The cartridge of claim 18 wherein the second substance is a liquid.

22. The cartridge of claim 18 wherein the first compartment is comprised of rigid walls.

23. The cartridge of claim 18 wherein the first compartment is comprised of rigid walls and the second compartment is comprised of rigid walls.

24. A disposable cartridge for mixing exothermic or endothermic reaction substances, comprising:
a first compartment operable contain a first substance;
a second compartment operable to contain a second substance;
a bellows for pumping air to cause a pressurization of the first substance;
an intake valve operable to draw outside air into the bellows;
a preferential break member between the first compartment and the second compartment, and operable upon breaking in response to the pressure, to mix the first substance and the second substance; and
a conduit being formed in an outer wall of the cartridge to release the pressurized air pumped into the compartments by operation of said bellows.

25. The cartridge of claim 24, wherein the conduit is operable to release pressurized air pumped into the first compartment by the bellows.

26. The cartridge of claim 24 wherein the flow is produced by repeatedly operating the bellows.

27. The cartridge of claim 24 wherein the first substance is a solid granular form substance and contained in the second container, and the second substance is a liquid solvent contained in the first container, and wherein the bellows is coupled to the first container.

* * * * *